(12) United States Patent
Yoshida

(10) Patent No.: US 7,508,248 B2
(45) Date of Patent: Mar. 24, 2009

(54) ELECTRONIC DEVICE

(75) Inventor: Yoshifumi Yoshida, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 11/494,309

(22) Filed: Jul. 26, 2006

(65) Prior Publication Data

US 2007/0029883 A1   Feb. 8, 2007

(30) Foreign Application Priority Data

Aug. 2, 2005   (JP)   ............................. 2005-223741

(51) Int. Cl.
*H03K 17/16* (2006.01)
(52) U.S. Cl. ...................................... 327/365; 327/390
(58) Field of Classification Search ................. 327/530, 327/534–538, 365, 376–378, 589, 390
See application file for complete search history.

(56) References Cited

U.S. PATENT DOCUMENTS 6,566,846 B1 * 5/2003 Voo ............................. 323/267

7,274,577 B2 * 9/2007 Utsunomiya .................. 363/59
2005/0078065 A1 * 4/2005 Hayafuji et al. ............... 345/76

FOREIGN PATENT DOCUMENTS

JP   2001-069687   3/2001

* cited by examiner

*Primary Examiner*—Dinh T. Le
(74) *Attorney, Agent, or Firm*—Brinks Hofer Gilson & Lione

(57) ABSTRACT

Provided is an electronic device capable of completely interrupting a power source and an electronic circuit when the electronic circuit is not being operated, and reducing power consumed wastefully. In the electronic device including the power source, a switch, and the electronic circuit, the power source and the electronic circuit are electrically interrupted by the switch when the electronic circuit is not being operated. The electronic device further includes a power generation source for converting environmental energy into electric energy, and a switch control circuit driven by the power generation source.

8 Claims, 4 Drawing Sheets

ELECTRONIC DEVICE

This application claims priority under 35 U.S.C. §119 to Japanese Patent Application No. 2005-223741 filed Aug. 2, 2005, the entire content of which is hereby incorporated by reference.

BACKGROUND OF THE INVENTION

1. Field of the Invention

The present invention relates to an electronic device, which is operated with a power source having a low output voltage and generates power using environmental energy.

2. Description of the Related Art

FIG. 8 shows a block diagram of a conventional electronic device. The electronic device includes a power source 101 for supplying power, a load circuit 107, a switch 103 for connecting the power source 101 and the load circuit 107, a switch control circuit 102 for controlling the switch 103, a capacitor 105 for storing power used for driving the switch control circuit 102, a charge/discharge control circuit 104 for supplying power from the power source 101 to the capacitor 105 when the power stored in the capacitor 105 becomes scarce, and an operation monitoring circuit 106 for monitoring an operation state of the load circuit (for example, see JP 2001-69687 A).

The load circuit 107 consumes power even in a standby state where the circuit is not being operated, so energy use efficiency has been very poor. In order to solve this problem, an attempt is made to minimize wasteful power by interrupting the connection between the power source 101 and the load circuit 107 by the switch 103, in the standby state.

In a case where the supply of power from the power source 101 is interrupted, the switch control circuit 102 controls the switch 103 using the power stored in the capacitor 105. When the power stored in the capacitor 105 becomes scarce, the switch control circuit 102 turns on the switch 103, and allows the charge/discharge control circuit 104 to supply the power to the capacitor 105. When the power stored in the capacitor 105 becomes sufficient, the switch control circuit 102 turns off the switch 103 again, and returns to the standby state. The charge/discharge control circuit 104 has functions of supplying the power supplied from the power source 101 to the capacitor 105, and preventing a flow of a current from the capacitor 105 to the load circuit 107.

When the load circuit attempts to enter the operation state, the operation monitoring circuit 106 sends a signal to the switch control circuit 102 to turn on the switch 103, and supplies the power of the power source 101 to the load circuit 107. The operation monitoring circuit 106 is connected to the capacitor 105, and is operated using the power of the capacitor 105. Therefore, even when the switch 103 is turned off and the power of the power source 101 is not supplied to the operation monitoring circuit 106, the operation monitoring circuit 106 can be operated.

With the circuits thus configured, standby power of the electronic device can be reduced.

In such the conventional electronic device, in order to control the switch 103, it is necessary that the switch control circuit 102 and the operation monitoring circuit 106 are constantly operated. The two circuits are operated using the power stored in the capacitor 105, and when the power stored in the capacitor 105 becomes scarce, the two circuits should be supplied with the power from the power source 101. In a case where the switch control circuit 102, the charge/discharge control circuit 104, the capacitor 105, the operation monitoring circuit 106, and the switch 103 provided for reducing the wasteful power when the load circuit 107 is in a standby state use the power to control the switch 103 for interrupting the wasteful power, reduction in power consumption will not be achieved.

Further, although the operation monitoring circuit 106 constantly monitors the operation of the load circuit 107, in order to operate the load circuit 107, it is necessary to supply the power to the load circuit 107. Since the power source 101 and the load circuit 107 are interrupted by the switch 103, the power stored in the capacitor 105 needs to be used for operating the load circuit 107. If the power consumption immediately after the starting of the load circuit 107 is extremely large, the load circuit 107 cannot be operated with the power of the capacitor 105, and the operation monitoring circuit 106 cannot detect the operation of the load circuit 107. Therefore, in the conventional electronic device, the load circuit 107 needs to be set so as to be operated with the power stored in the capacitor 105 at the time of starting.

SUMMARY OF THE INVENTION

The present invention has been made in view of the above inconveniences of the prior art, and it is an object of the invention to reduce power consumed wastefully by interrupting a power source and an electronic circuit completely when the electronic circuit is not being operated.

In order to attain the above-mentioned object, according to an aspect of the present invention, there is provided an electronic device, including: a power source; an electronic circuit that is driven with power of the power source supplied via a switch circuit; a power generation source for generating power using environmental energy; and a switch control circuit that is driven with the power of the power source, for controlling the switch circuit.

Therefore, the wasteful power consumed in the electronic circuit in a standby state can be reduced, which enhances energy use efficiency of an entire system.

The electronic device of the present invention as described above includes a power generation source for generating power using environmental energy, and a charge/discharge circuit that is driven with the power of the power source to control the switch circuit. Therefore, the following effects can be obtained.

(1) In a case where the power source is a battery, a life of the battery in the entire system can be prolonged.

(2) Power consumption in a standby state when the load circuit is not being operated is zero.

(3) Owing to a booster circuit, even when output voltage of the power generation source is small, the switch can be controlled.

(4) The switch circuit is driven with a charge stored in a capacitor, which raises no problem even if the switch circuit cannot be driven directly with the charge generated by the power generation source. Thus, the power generation source can be miniaturized.

(5) In a case where the electronic circuit is a communication circuit, generation of electromagnetic noise can be suppressed by employing a charge pump system using the capacitor for the booster circuit. Therefore, the communication circuit can perform stable communication signal processing.

DETAILED DESCRIPTION OF THE PREFERRED EMBODIMENTS

First Embodiment

Figure 1:
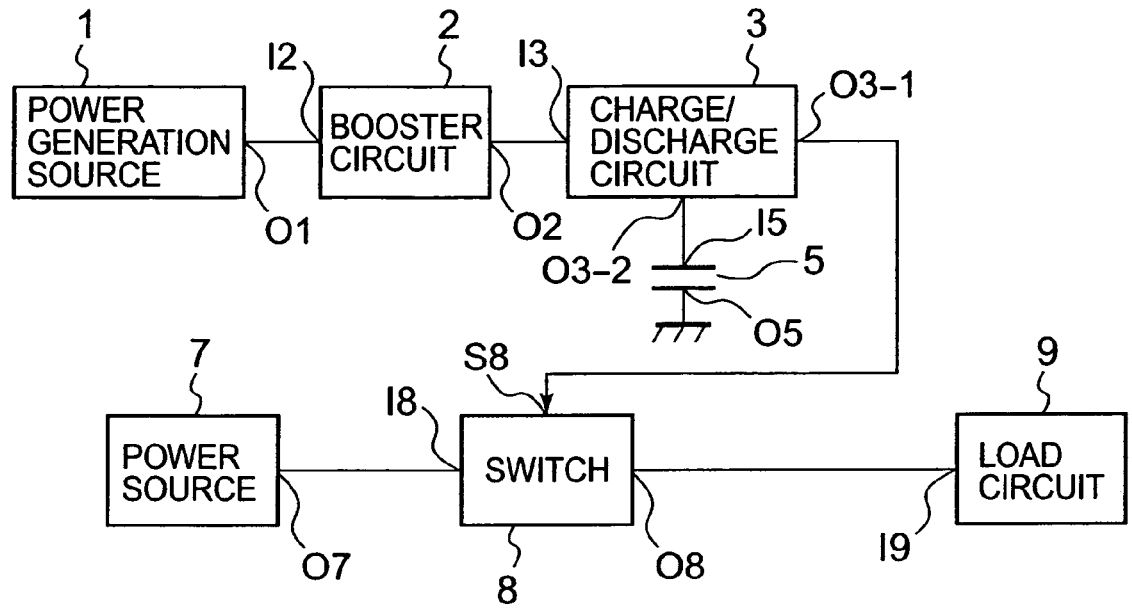
FIG. 1 is a block diagram of an electronic device according to a first embodiment.

FIG. 1 is a block diagram of an electronic device according to a first embodiment. The electronic device includes a power generation source 1, a booster circuit 2 for boosting power generation voltage of the power generation source 1, a capacitor 5 for storing boosting power boosted by the booster circuit 2, a charge/discharge circuit 3 for monitoring the stored voltage in the capacitor 5 to control charge/discharge of the capacitor 5, and turning on/off the switch circuit 8, a power source 7, a switch 8, and a load circuit 9 that is driven with power of the power source 7.

As the power generation source 1, for example, a solar battery, a thermal power generator, a piezoelectric element, a power generator for converting rotation energy into electricity, a power generator for converting the change in a magnetic field and an electromagnetic field into electricity, or the like is used. These power generation sources have small power generation voltage per basic unit element, and in order to output higher voltage, a number of unit elements of the power generation source need to be connected in series. Further, in order to directly obtain large voltage (power) from this type of power generation source 1, it is necessary to enlarge the size of the power generation source.

As the booster circuit 2, for example, a regulator using a coil and a capacitor, or a charge-pump system using only a capacitor is used. The power generation voltage of the power generation source 1 is small, so the booster circuit 2 should be able to perform a boosting operation with low voltage. Herein, in the case where the electronic device according to the present invention is an electronic device that performs communication, it is necessary to minimize electromagnetic noise generated in each circuit in the electronic device. Therefore, it is desirable to use the charge-pump system that generates less electromagnetic noise as the booster circuit, instead of using the switching regulator using a coil as the booster circuit.

Hereinafter, the configuration of the charge-pump system that is an exemplary booster circuit will be described in detail with reference to FIG. 2.

Figure 2:
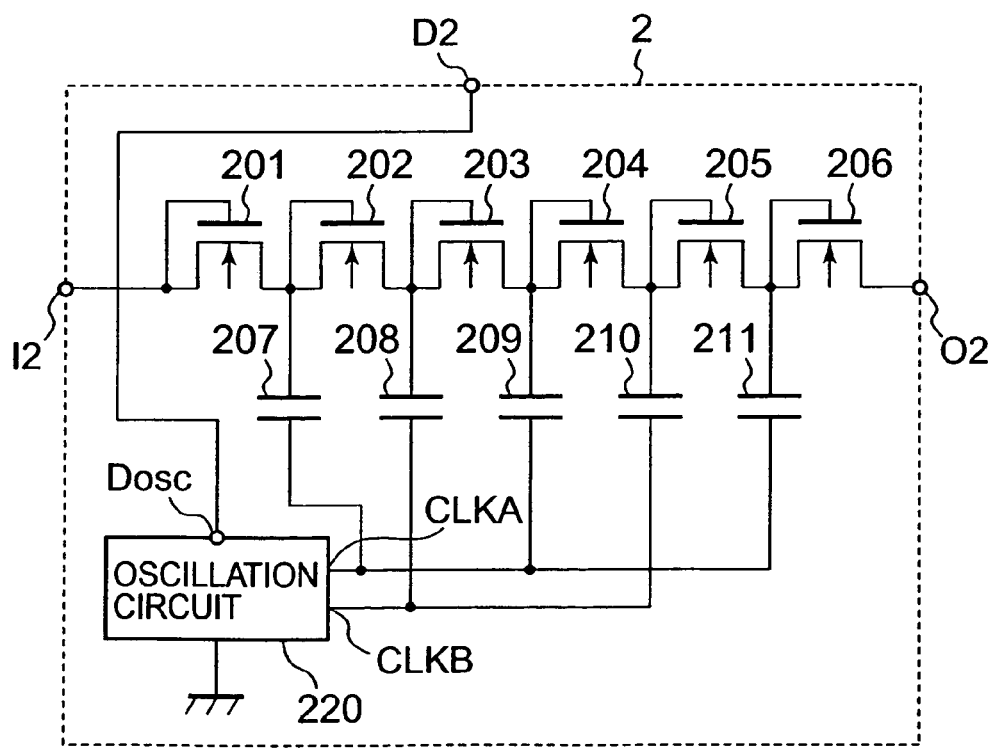
FIG. 2 is a circuit diagram of an exemplary booster circuit used in an electronic device of the present invention.

As shown in FIG. 2, the booster circuit of the charge-pump system is composed of an oscillation circuit 220, N-channel type MOSFETs 201 to 206, and booster capacitors 207 to 211. The N-channel type MOSFETs 201 to 206 are respectively connected to diodes, and connected in series between an input terminal I2 of the booster circuit 2 and an output terminal O2 thereof so that the direction from the input terminal I2 to the output terminal O2 becomes a forward direction. The N-channel type MOSFETs 201 to 206 are respectively connected to diodes in the following manner: one side electrode of the booster capacitor 207 is connected to a node between the N-channel type MOSFET 201 and the N-channel type MOSFET 202; one side electrode of the booster capacitor 208 is connected to a node between the N-channel type MOSFET 202 and the N-channel type MOSFET 203; one-side electrode of the booster capacitor 209 is connected to a node between the N-channel type MOSFET 203 and the N-channel type MOSFET 204; one side electrode of the booster capacitor 210 is connected to a node between the N-channel type MOSFET 204 and the N-channel type MOSFET 205; and one side electrode of the booster capacitor 211 is connected to a node between the N-channel type MOSFET 205 and the N-channel type MOSFET 206. The other side of the electrodes of the booster capacitors 207, 209, and 211 are connected to a clock A terminal CLKA of the oscillation circuit 220, and the other side of the electrodes of the booster capacitors 208 and 210 are connected to a clock B terminal CLKB of the oscillation circuit 220. A clock signal A with an on-duty of 50% is output from the clock A terminal CLKA of the oscillation circuit 220, and a clock signal B having the same conditions as those of the clock signal A except that the phase is shifted by 90° from that of the clock signal A is output from the clock B terminal CLKB of the oscillation circuit 220. A power source terminal Dosc of the oscillation circuit 220 is connected to a power source terminal D2 of the booster circuit 2. The frequencies of the clock signals A and B output from the oscillation circuit 220 are set to be about 1 MHz, and considering that boosting power $P_{up}$ is stored in the capacitor 5, the booster capacitors 207 to 211 may have about 100 pF of capacity. Thus, the booster capacitors 207 to 211 can be produced in the same chip as those of the N-channel type MOSFETs 201 to 206 or the oscillation circuit 220.

As the capacitor 5, an electric double layer or a secondary battery, as well as a ceramic capacitor or an electrolytic capacitor, is used.

The charge/discharge circuit 3 stores boosting power $P_{up}$ supplied from the booster circuit 2 in the capacitor 5, monitors the voltage stored in the capacitor 5, and supplies the stored power to the switch 8 when a stored voltage $V_{cap}$ of the capacitor 5 reaches a voltage $V_{sw}$ at which the switch 8 can be operated.

The power source 7 is a power source required for operating the load circuit 9. For example, an AC power source, a primary battery, a secondary battery, a DC power source supplied from an AC-DC converter, or the like is used.

The switch 8 is connected between the power source 7 and the load circuit 9, and has a function of switching the switch 8 with the power supplied from the charge/discharge circuit 3. Herein, as the switch 8, a MOSFET is used. The gate terminal of the MOSFET is set to be a control terminal S8 of the switch 8, a drain terminal of the MOSFET is set to be an input terminal I8 of the switch 8, and a source terminal of the MOSFET is set to be an output terminal O8 of the switch 8.

The electronic device of the first embodiment connects the output terminal O1 of the power generation source 1 and the input terminal I2 of the booster circuit 2, and connects the output terminal O2 of the booster circuit 2 and the input terminal I3 of the charge/discharge circuit 3. A charge/discharge terminal O3-2 of the charge/discharge circuit 3 is connected to an input terminal I5 of the capacitor 5, a ground terminal O5 of the capacitor 5 is grounded, and an output terminal O3-1 of the charge/discharge circuit 3 is connected to the control terminal S8 of the switch 8. An output terminal O7 of the power source 7 is connected to the input terminal I8 of the switch 8, and an output terminal O8 of the switch 8 is connected to the input terminal I9 of the load circuit 9.

The electronic device thus connected is operated as follows.

When the power generation source 1 is supplied with light, heat, kinetic energy, or an electromagnetic force, the power generation source 1 generates power and the power is boosted by the booster circuit 2. The booster circuit 2 is activated with the power supplied from the power generation source 1, and starts a boosting operation. Since a voltage $V_{gen}$ output from the power generation source 1 is very low, the operation procedure of the booster circuit 2 is extremely important. First, the oscillation circuit 220 inside the booster circuit 2 starts an operation with the voltage supplied from the power generation source 1, and performs the boosting operation. Although the voltage boosted at this time is not so high, by returning the boosted voltage to the internal circuit of the booster circuit 2, the output voltage of the booster circuit 2 can be increased gradually. This is repeated, whereby high voltage can be generated. The boosted power $P_{up}$ is charged to the capacitor 5 through the charge/discharge circuit 3. Herein, the power supplied from the power generation source 1 is mostly very small. This is because the power generation source 1 that generates power with light, heat, and kinetic energy has a very small power generation amount per unit area, compared with the primary battery or the secondary battery. Therefore, it is more efficient to temporarily store the output of the booster circuit 2 in the capacitor 5 for a predetermined period of time, and supply the stored power at once without directly connecting the output to the switch 8. In the case where the voltage of the charged capacitor 5 reaches voltage equal to or higher than the voltage at which the switch 8 can be operated, the charge/discharge circuit 3 supplies the power stored in the capacitor 5 to the switch 8 at once. The capacity of the capacitor 5 is large enough to store power sufficient to turn on/off the switch 8.

The switch 8 supplied with the power is turned on, and connects the power source 7 and the load circuit 9. When the power stored in the capacitor 5 is exhausted, the voltage of the output terminal O3-1 of the charge/discharge circuit 3 decreases, and the switch 8 is turned off to interrupt the power source 1 and the load circuit 9.

Second Embodiment

Figure 3:
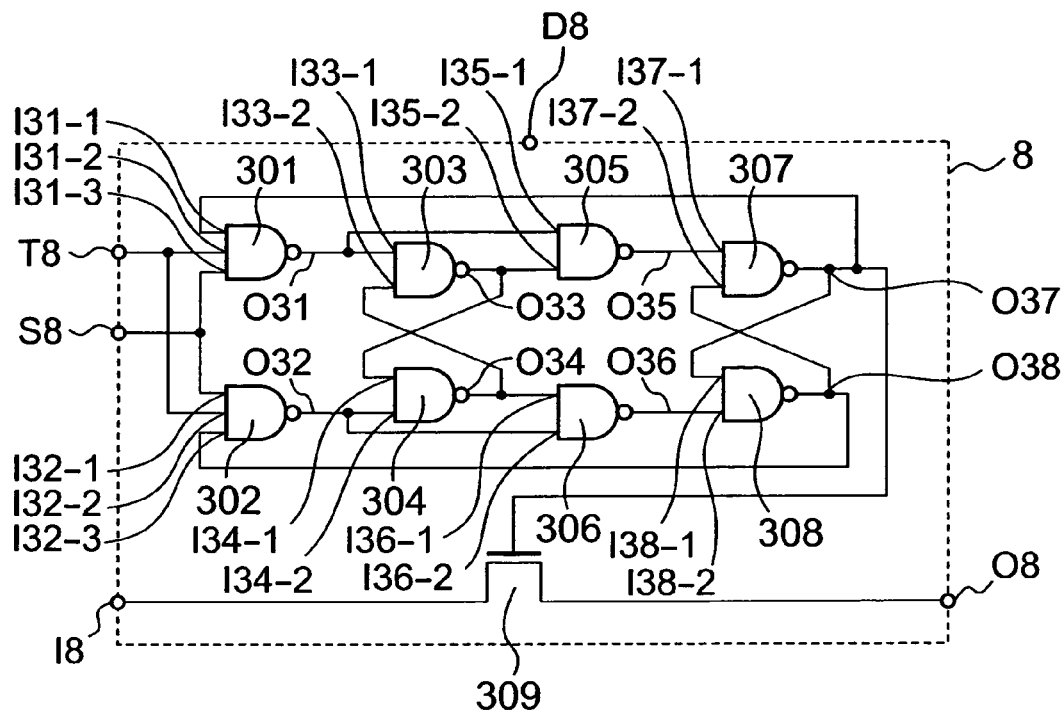
FIG. 3 is a circuit diagram of a switch used in electronic devices according to second to fourth embodiments of the present invention.
Figure 4:
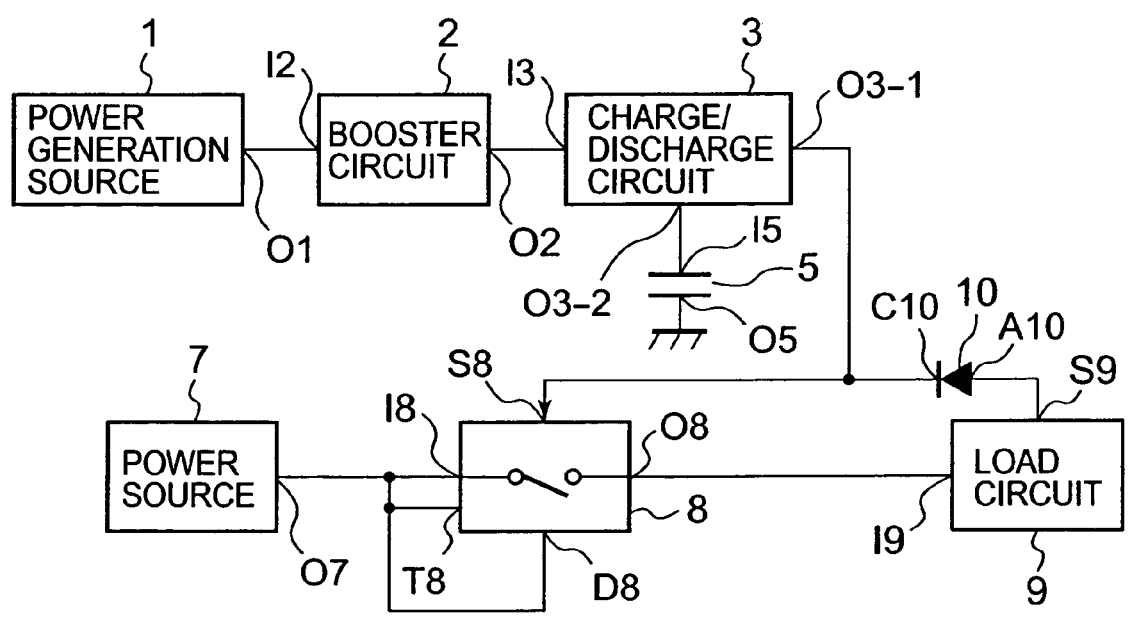
FIG. 4 is a block diagram of the electronic device according to the second embodiment.

FIG. 4 is a block diagram of an electronic device according to a second embodiment. In the electronic device of the second embodiment, a switch has a configuration including a latch circuit as shown in FIG. 3. If the switch has a latch function, when power is supplied to change a state, the changed state is kept until a signal is input again. Therefore, it is desirable that the switch 8 has a latch function. An object of the electronic device of the present invention is to reduce power consumption. Therefore, an effect of the present invention is further enhanced by using a latch-type switch.

As a switch having a latch function, a mechanical switch with a latch mechanism using an MEMS technique, a switch obtained by combining a MOSFET and a flip-flop circuit, or a latch switch in which a rotation switch is connected to a stepping motor of a clock is used. Hereinafter, the configuration of a switch obtained by combining a MOSFET and a flip-flop circuit, which is an exemplary switch with a latch function, will be described with reference to FIG. 3.

As shown in FIG. 3, the latch switch is composed of a MOSFET 309 and NAND circuits 301 to 308. A first input terminal I31-1 of the NAND circuit 301 is connected to an output terminal O37 of the NAND circuit 307, a second input terminal I31-2 of the NAND circuit 301 is connected to a torque terminal 311 of the switch 8, a third input terminal I31-3 of the NAND circuit 301 is connected to a control terminal S8 of the switch 8, and an output terminal O31 of the NAND circuit 301 is connected to a first input terminal I33-1 of the NAND circuit 303 and a first input terminal I35-1 of the NAND circuit 305. A first input terminal I32-1 of the NAND circuit 302 is connected to the control terminal S8 of the switch 8, a second input terminal I32-2 of the NAND circuit 302 is connected to a torque terminal 311 of the switch 8, a third input terminal I32-3 of the NAND circuit 302 is connected to an output terminal O38 of the NAND circuit 308, an output terminal O32 of the NAND circuit 302 is connected to a second input terminal I34-2 of the NAND circuit 304 and a second input terminal I36-2 of the NAND circuit 305. A second input terminal I33-2 of the NAND circuit 303 is connected to an output terminal O34 of the NAND circuit 304, and an output terminal O33 of the NAND circuit 303 is connected to a first input terminal I34-1 of the NAND circuit 304 and a second input terminal I35-2 of the NAND circuit 305. A first input terminal I34-1 of the NAND circuit 304 is connected to an output terminal O33 of the NAND circuit 303, and an output terminal O34 of the NAND circuit 304 is connected to a first input terminal I36-1 of the NAND circuit 306 and a second input terminal I33-2 of the NAND circuit 303. An output terminal O35 of the NAND circuit 305 is connected to a first input terminal I37-1 of the NAND circuit 307. An output terminal O36 of the NAND circuit 306 is connected to a second input terminal I38-1 of the NAND circuit 308. A second input terminal I37-2 of the NAND circuit 307 is connected to an output terminal O38 of the NAND circuit 308, and an output terminal O37 of the NAND circuit 307 is connected to a gate of the MOSFET 309. A drain terminal of the MOSFET 309 is connected to an input terminal 18 of the switch 8, and a source terminal of the MOSFET 309 is connected to an output terminal O8 of the switch 8. Further, a power source terminal D8 for a logic circuit is provided.

The electronic device of the second embodiment connects an output terminal O1 of the power generation source 1 and an input terminal I2 of the booster circuit 2, and connects an output terminal O2 of the booster circuit 2 and an input terminal I3 of the charge/discharge circuit 3. The charge/discharge terminal O3-2 of the charge/discharge circuit 3 is connected to the input terminal I5 of the capacitor 5, the ground terminal O5 of the capacitor 5 is grounded, and an output terminal O3-1 of the charge/discharge circuit 3 is connected to a control terminal S8 of the switch 8. An output terminal O7 of the power source 7 is connected to an input terminal I8 of the switch 8, a power source terminal D8 of the switch 8, and a toggle terminal T8 of the switch 8, and an output terminal O8 of the switch 8 is connected to an input terminal 19 of the load circuit 9. A control terminal S9 of the load circuit 9 is connected to an anode terminal A10 of the diode 10, and a cathode terminal C10 of the diode 10 is connected to a control terminal S8 of the switch 8. In the case of the above connection, as the power source 7, a primary battery, a secondary battery, or a DC power source supplied from an AC-DC converter is used.

The switch configured as described above is operated as follows. Since the power source terminal D8 and the toggle terminal T8 of the switch 8 are connected to the output terminal O7 of the power source 7, when a signal is input to the control terminal S8, a flip-flop circuit or a MOSFET that is an internal circuit of the switch 8 can respond immediately. Since the toggle terminal T8 is connected to the output terminal O7 of the power source 7, when a first 1 pulse signal is input to the control terminal S8 of the switch 8, the output terminal O37 of the flip-flop circuit outputs a signal of High, and when a second 1 pulse signal is input thereto, the output terminal O37 of the flip-flop circuit outputs a signal of Low. Then, when a third 1 pulse signal is input, the output terminal O37 of the flip-flop circuit outputs a signal of High, and when a fourth 1 pulse signal is input, the output terminal O37 of the flip-flop circuit outputs a signal of Low. Thus, the outputs of High and Low signals are repeated.

When the power stored in the capacitor 5 is supplied to the control terminal S8 of the switch 8, the control signal waveform becomes a 1 pulse form. When the 1 pulse is input to the control terminal S8 of the switch 8, the flip-flop circuit that is an internal circuit of the switch 8 outputs a High signal to the output terminal O37, and sends the signal to a gate terminal of the MOSFET 309. The MOSFET 309 having received the signal turns on a channel, thereby connecting the input terminal I8 and the output terminal O8 of the switch 8. The output terminal 7 of the flip-flop circuit continues to output a High signal until a subsequent pulse signal is input to the control terminal S8, thereby keeping the connection between the input terminal I8 and the output terminal O8 of the switch 8.

Next, in order to stop the operation of the load circuit 9 by turning off the switch 8, a control signal is sent from the control terminal S9 of the load circuit 9. When the control signal is input to the control terminal S8 of the switch 8, the output terminal O37 of the flip-flop circuit outputs a Low signal, and sends the signal to a gate terminal of the MOSFET 309. The MOSFET 309 having received the signal turns off the channel, thereby interrupting the connection between the input terminal I8 and the output terminal O8 of the switch 8. The output terminal O37 of the flip-flop circuit continues to output a Low signal until a subsequent pulse signal is input to the control terminal S8, thereby keeping the interruption of the connection between the input terminal I8 and the output terminal O8 of the switch 8.

Third Embodiment

Figure 5:
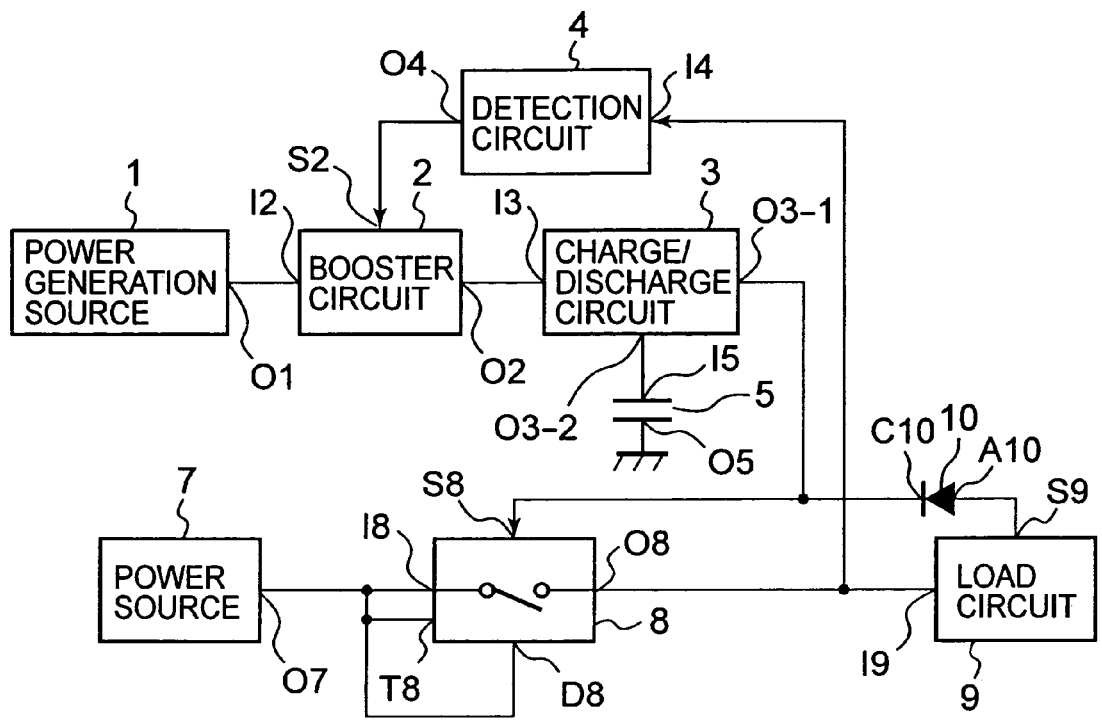
FIG. 5 is a block diagram of the electronic device according to the third embodiment.

FIG. 5 is a block diagram of an electronic device of the third embodiment. In the electronic device of the third embodiment, a detection circuit 4 for monitoring the ON state of the switch 8 is provided, and has a function of forcefully stopping the operation of the booster circuit 2 when the switch 8 is in an ON state.

The electronic device of the third embodiment connects the output terminal O1 of the power generation source 1 to the input terminal I2 of the booster circuit 2, and connects the output terminal O2 of the booster circuit 2 to the input terminal I3 of the charge/discharge circuit 3. The charge/discharge terminal O3-2 of the charge/discharge circuit 3 is connected to the input terminal I5 of the capacitor 5, the ground terminal O5 of the capacitor 5 is grounded, and the output terminal O3-1 of the charge/discharge circuit 3 is connected to the control terminal S8 of the switch 8. The output terminal O7 of the power source 7 is connected to the input terminal I8 of the switch 8, and the output terminal O8 of the switch 8 is connected to the input terminal I9 of the load circuit 9. The output terminal O8 of the switch 8 is connected to the input terminal I4 of the detection circuit 4, and the output terminal O4 of the detection circuit 4 is connected to the control terminal S2 of the booster circuit 2. The control terminal S9 of the load circuit 9 is connected to an anode terminal A10 of the diode 10, and a cathode terminal C10 of the diode 10 is connected to the control terminal S8 of the switch 8.

The detection circuit 4 monitors a driving voltage $V_{load}$ from the power source 7 supplied through the switch 8, thereby determining whether the switch 8 is in an ON state or an OFF state. When the switch 8 is in an ON state, the detection circuit 4 sends a stop signal $S_{stop}$ to the booster circuit 2 to stop the boosting operation. This can prevent the power stored in the capacitor 5 from being sent to the switch 8 wastefully.

The diode 10 connects the control terminal S9 of the load circuit 9 to the control terminal S8 of the switch 8 with the direction from the control terminal S9 of the load circuit 9 to the control terminal S8 of the switch 8 being a forward direction. This can send a signal for turning off the switch 8 from the load circuit 9 to the control terminal S8, and can prevent a 1 pulse signal output from the output terminal O3-1 of the charge/discharge circuit 3 from flowing in the control terminal S9 of the load circuit 9.

The electronic device connected as described above is operated as follows.

When the power stored in the capacitor 5 is supplied to the control terminal S8 of the switch 8, the switch 8 connects the input terminal I8 to the output terminal O8. The switch 8 has a latch function, so the connection between the input terminal I8 and the output terminal O8 of the switch 8 is kept until a subsequent signal is input. When the switch 8 is turned on to supply the power of the power source 1 to the load circuit 9, the detection circuit 4 confirms that the switch 8 is in an ON state by monitoring the driving voltage $V_{load}$ through a detection terminal, and sends a stop signal $S_{stop}$ from the output terminal O4 of the detection circuit to the booster circuit 2 so as to stop the boosting operation. The booster circuit 2 having received the stop signal $S_{stop}$ at the operation control terminal S2 of the booster circuit 2 from the output terminal O4 of the detection circuit 4 stops the boosting operation and stops the supply of the power to the capacitor 5. Because of this, the circuit controlling the switch 8 does not consume wasteful power.

Next, when the load circuit 9 stops an operation, a signal is sent to the control terminal S8 of the switch 8 from the control terminal S9 of the load circuit 9 through the diode 10, whereby the switch 8 is turned off, and the connection between the power source 7 and the load circuit 9 is interrupted until a subsequent control signal is input. Because of this, wasteful power consumption (leakage current and useless circuit operation) during a standby state in the load circuit 9 can be prevented.

Fourth Embodiment

Figure 6:
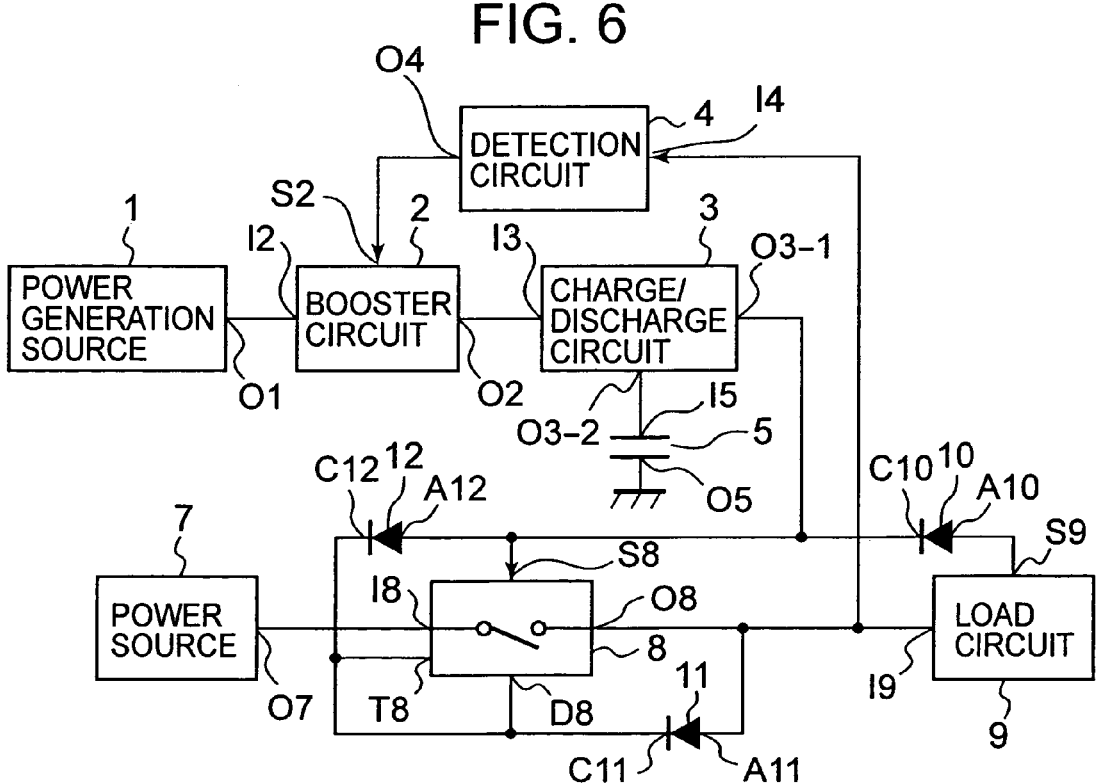
FIG. 6 is a block diagram of the electronic device according to the fourth embodiment.

FIG. 6 is a block diagram of an electronic device of the fourth embodiment. The electronic device of the fourth embodiment is characterized in that the power source terminal D8 of the switch 8 is connected to the output terminal O3-1 of the charge/discharge circuit 3. In the case of a witch with a latch function, power is required for keeping the ON or OFF state of the switch. Therefore, in the example shown in FIG. 5, connection is made so as to obtain the power from the power source 7. However, in this state, the power is always consumed when the switch 8 is in an OFF state. By connecting the power source terminal D8 of the switch 8 to the output terminal O3-1 of the charge/discharge circuit 3, the power is consumed only when the switch is turned on, and the power is not consumed when the switch is in an OFF state.

The electronic device of the fourth embodiment connects the output terminal O1 of the power generation source 1 to the input terminal I2 of the booster circuit 2, and connects the output terminal O2 of the booster circuit 2 to the input terminal I3 of the charge/discharge circuit 3. The charge/discharge terminal O3-2 of the charge/discharge circuit 3 is connected to the input terminal I5 of the capacitor 5, and the ground terminal O5 of the capacitor 5 is grounded, and the output terminal O3-1 of the charge/discharge circuit 3 is connected to the control terminal S8 of the switch 8. The output terminal O7 of the power source 7 is connected to the input terminal I8 of the switch 8, and the output terminal O8 of the switch 8 is connected to the input terminal I9 of the load circuit 9. The output terminal O8 of the switch 8 is connected to the input terminal I4 of the detection circuit 4, and the output terminal O4 of the detection circuit 4 is connected to the control terminal S2 of the booster circuit 2. The control terminal S9 of the load circuit 9 is connected to the anode terminal A10 of the diode 10, and the cathode terminal C10 of the diode 10 is connected to the control terminal S8 of the switch 8. The output terminal O8 of the switch 8 is connected to the anode terminal A11 of the diode 11, and the cathode terminal C11 of the diode 11 is connected to the power source terminal D8 of the switch 8. The output terminal O3-1 of the charge/discharge circuit 3 is connected to an anode terminal A12 of the diode 12, and a cathode terminal C12 of the diode 12 is connected to the power source terminal D8 of the switch 8. The toggle terminal T8 of the switch 8 is connected to the power source terminal D8 of the switch 8.

The electronic device connected as descried above is operated as follows.

When the power stored in the capacitor 5 is supplied to the control terminal S8 of the switch 8 from the output terminal O3-1 of the charge/discharge circuit 3, a part of the power is supplied to the power source terminal D8 and the toggle terminal T8 of the switch 8 through the diode 12. This sets the switch 8 in an operable state, and the switch 8 connects the input terminal I8 to the output terminal O8. When the switch 8 is turned on, the power $P_{load}$ is supplied from the power source 7 to the load circuit 9, and supplied to the power source terminal D8 and the toggle terminal T8 of the switch 8 through the diode 11. Although the switch 8 has a latch function, in the case where the power is supplied from the charge/discharge circuit 3, the latch state cannot be kept with the power supply of 1 pulse. However, in this embodiment, when the switch 8 is turned on, the power is obtained from the output terminal O8 of the switch 8. Therefore, the latch state can be kept, and the connection between the input terminal I8 and the output terminal O8 of the switch 8 is kept until a subsequent signal is input. When the switch 8 is turned on to supply the power of the power source 1 to the load circuit 9, the detection circuit 4 confirms that the switch 8 is in an ON state by monitoring the driving voltage $V_{load}$ through the detection terminal, and sends a stop signal $S_{stop}$ from the output terminal O4 of the detection circuit to the booster circuit 2 so as to stop the boosting operation. The booster circuit 2 having received the stop signal $S_{stop}$ at the operation control terminal S2 of the booster circuit 2 from the output terminal O4 of the detection circuit 4 stops the boosting operation and stops supplying the power to the capacitor 5. Because of this, the circuit for controlling the switch 8 does not consume wasteful power.

Next, when the load circuit 9 stops the operation, a signal is sent from the control terminal S9 of the load circuit 9 to the control terminal S8 of the switch 8 through the diode 10, whereby the switch 8 is turned off, and the connection between the power source 7 and the load circuit 9 is interrupted until a subsequent control signal is input. Because of this, wasteful power consumption (leakage current and useless circuit operation) during a standby state in the load circuit 9 can be prevented.

Fifth Embodiment

Figure 7:
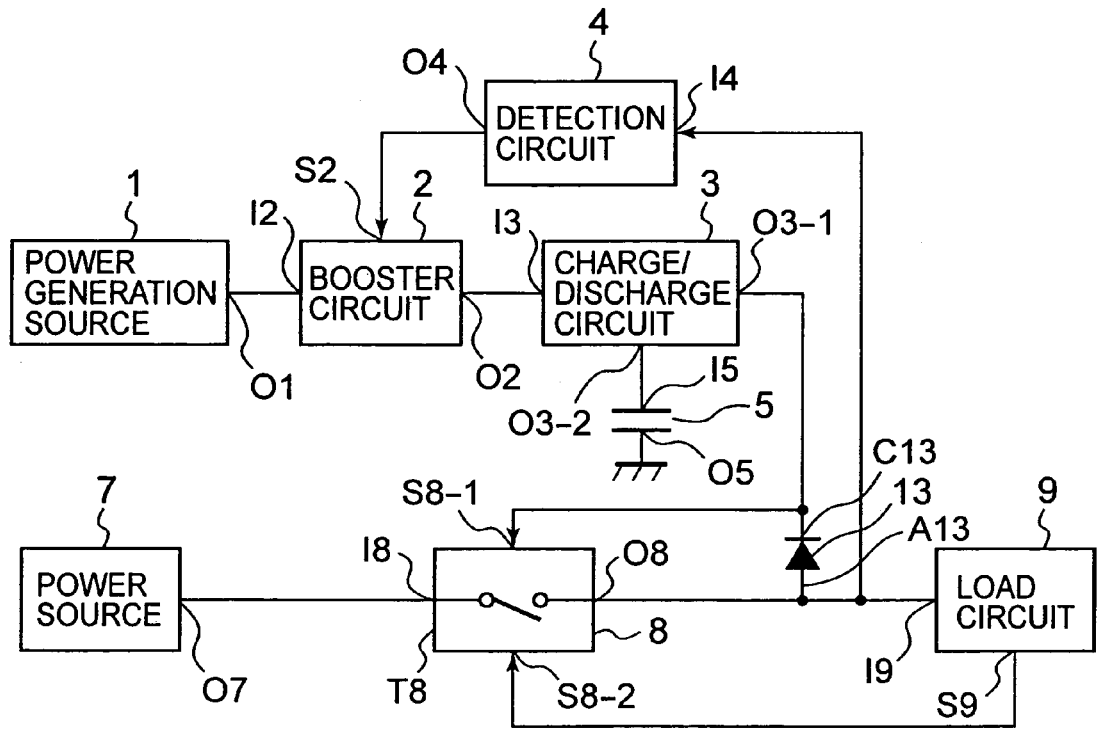
FIG. 7 is a block diagram of the electronic device according to the fifth embodiment.
Figure 8:
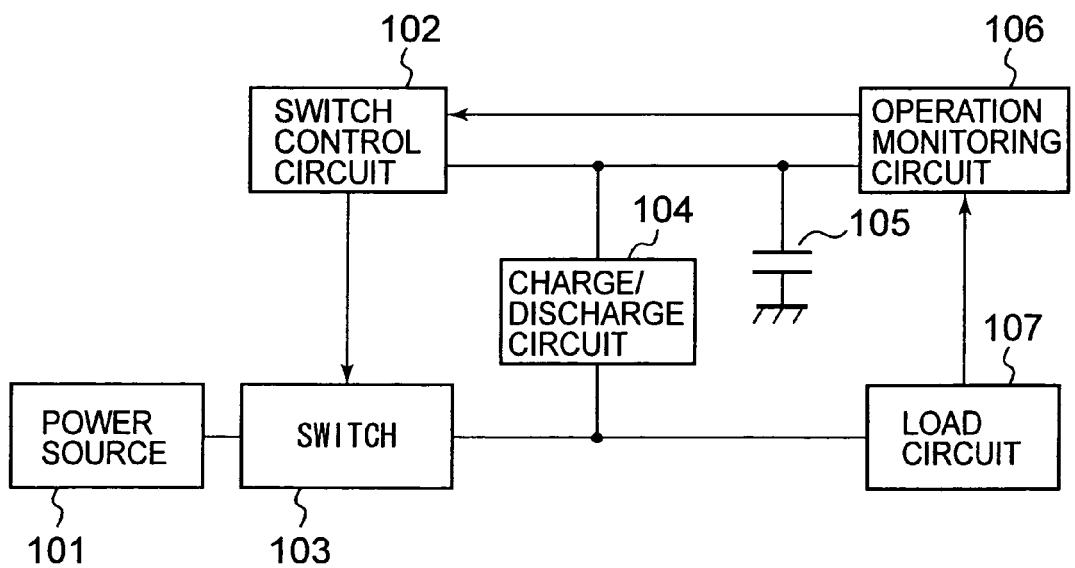
FIG. 8 is a block diagram of a conventional electronic device.

FIG. 7 is a block diagram of an electronic device of the fifth embodiment. The electronic device of the fifth embodiment is characterized in that the switch 8 does not have a latch function, but has two control terminals so as to turn on when a signal is present at one control terminal, and turn off when the signal is present at the other control terminal.

The electronic device of the fifth embodiment connects the output terminal O1 of the power generation source 1 to the input terminal I2 of the booster circuit 2, and connects the output terminal O2 of the booster circuit 2 to the input terminal I3 of the charge/discharge circuit 3. The charge/discharge terminal O3-2 of the charge/discharge circuit 3 is connected to the input terminal I5 of the capacitor 5, the ground terminal O5 of the capacitor 5 is grounded, and the output terminal O3-1 of the charge/discharge circuit 3 is connected to the first control terminal S8-1 of the switch 8. The output terminal O7 of the power source 7 is connected to the input terminal I8 of the switch 8, and the output terminal O8 of the switch 8 is connected to the input terminal I9 of the load circuit 9 and the anode terminal A13 of the diode 13. The output terminal O8 of the switch 8 is connected to the input terminal I4 of the detection circuit 4, and the output terminal O4 of the detection circuit 4 is connected to the control terminal S2 of the booster circuit 2. The cathode terminal C13 of the diode 13 is connected to the first control terminal S8-1 of the switch 8. The control terminal S9 of the load circuit 9 is connected to the second control terminal S8-2 of the switch 8.

The electronic device connected as descried above is operated as follows.

When the power stored in the capacitor 5 is supplied to a first control terminal S8-1 of the switch 8 from the output terminal O3-1 of the charge/discharge circuit 3, the switch 8 connects the input terminal I8 to the output terminal O8. When the switch 8 is turned on, the driving power is supplied from the power source 7 to the load circuit 9, and is supplied to the first control terminal S8-1 of the switch 8 through the diode 13. Because of this, the switch 8 can keep the switch in an ON state even without having a latch function. When the switch 8 is turned on to supply the power of the power source 1 to the load circuit 9, the detection circuit 4 confirms that the switch 8 is in an ON state by monitoring the driving voltage $V_{load}$ through the detection terminal, and sends a stop signal $S_{stop}$ from the output terminal O4 of the detection circuit to the booster circuit 2 so as to stop the boosting operation. The booster circuit 2 having received the stop signal $S_{stop}$ at the operation control terminal S2 of the booster circuit 2 from the output terminal O4 of the detection circuit 4 stops the boosting operation and stops supplying the power to the capacitor 5. Because of this, the circuit for controlling the switch 8 does not consume wasteful power.

Next, when the load circuit 9 stops the operation, a signal is sent from the control terminal S9 of the load circuit 9 to a second control terminal S8-2 of the switch 8, whereby the switch 8 is turned off forcefully. Because of this, the power source 7 and the load circuit 9 can be interrupted completely, and the wasteful power consumption (leakage current and useless circuit operation) during a standby state in the load circuit 9 can be prevented.

Further, the electronic device of the fifth embodiment has a function of interrupting the power source 7 and the load circuit 9 while the power is being supplied to the first control terminal S8-1 of the switch 8, and bringing the power source 7 into conduction with the load circuit 9 while the power is not being supplied to the first control terminal S8-1 of the switch 8. The system turns off the switch 8 when there is external environmental change energy such as light, heat, kinetic energy, electromagnetic energy, and the like to be a base of the power generation source 1, and allows the load circuit 9 to start the operation when light, heat, kinetic energy, and electromagnetic energy are exhausted. A specific example includes a system that starts being operated when the power generated by a solar battery is exhausted, such as a street lamp system that lights up when it gets dark.

Sixth Embodiment

The configuration and connection of the electronic device of the sixth embodiment are the same as those descried in the electronic device of the fifth embodiment.

The operation of the electronic device of the sixth embodiment will be described. The switch 8 is in an ON state when it is not energized. Therefore, the power source 7 is connected to the load circuit 9, and the load circuit 9 is being operated. At this time, the power generation source 1 is supplied with light, heat, kinetic energy, or electromagnetic energy to generate power, and the power is boosted in the booster circuit 2. The booster circuit 2 is activated with the power supplied from the power generation source 1, and starts a boosting operation. The power thus boosted is charged to the capacitor 5 through the charge/discharge circuit 3. In the case where the voltage of the charged capacitor 5 reaches a voltage $V_{sw}$ or higher that can operate the switch 8, the charge/discharge circuit 3 supplies the power from the capacitor 5 to the first control terminal S8-1 of the switch 8. Herein, the capacitor of the capacitor 5 is sufficient for storing the power capable of turning off the switch 8. The switch 8 supplied with the power turns off the switch, and interrupts the connection between the power source 7 and the load circuit 9.

When the external environmental change energy such as light, heat, kinetic energy, and electromagnetic energy to be a base of the power generation source 1 is exhausted, the power cannot be supplied to the switch 8, and the switch 8 is turned on again. Accordingly, the power of the power source 7 is supplied to the load circuit 9, and the operation of the electronic circuit is started. Herein, a signal is sent from the control terminal S9 of the load circuit 9 to the second control terminal S8-2 of the switch 8, whereby the supply of the power from the power source 7 to the load circuit 9 can be interrupted forcefully.

In the electronic device of the present invention configured as described above, the effect of the invention is enhanced further by applying the electronic device to an active RF tag on which a battery is mounted. In the case of the active RF tag, the electronic device itself with the active RF tag cannot determine whether the electronic device is in a communicable region. Therefore, the electronic device continues to send a signal intermittently. In this case, when the electronic device is present in a place where the device cannot perform communication, it merely consumes power wastefully. By applying the present invention to an active RF tag, the life of the battery can be enhanced remarkably by reducing the wasteful power consumption. To be more specific, when the electronic device passes through a region where an electromagnetic wave is supplied in an active RF tag in which an RF coil is used as the power generation source 1 and a primary battery is used as the power source 7, power is generated from the RF coil. At this time, the voltage to be generated varies largely depending upon the intensity of the electromagnetic wave, the size of the coil, and the winding number of the coil. However, the electronic device of the present invention contains the booster circuit 2, so it can be operated without any problem. Thus, by using the electronic device of the present invention, the output power of the electromagnetic wave or the size of the coil can be reduced.

Next, the voltage generated by the RF coil is boosted in the booster circuit 2, and is stored in the capacitor 5 through the charge/discharge circuit 3. In the case where the voltage of the charged capacitor 5 reaches a voltage $V_{sw}$ or higher that can operate the switch 8, the charge/discharge circuit 3 supplies the power from the capacitor 5 to the control terminal S8 of the switch 8. The capacity of the capacitor 5 is sufficient for storing the power capable of turning on the switch 8. The switch 8 supplied with the power turns on the switch to connect the primary battery to the RF processing circuit.

When the electronic device with the active RF tag comes out of a communicable region, the power generated by the RF coil is exhausted, so that a signal for controlling the switch 8 cannot be sent, and the switch 8 is turned off. Herein, the communication time of the RF tag is very short, and a time of 1 pulse during which the switch 8 is in an ON state with the power sent from the capacitor 5 is sufficient in many cases. In those cases, the electronic device performs communication a number of times while it is in a communicable region, and stops communication when it comes out of the communicable region. In the above case, the switch 8 is assumed to be an MOSFET. However, a switch having a latch function may be used. In this case, the circuit is connected as shown in FIG. 4, and the switch 8 is put in a standby state with the power from the power source 7. However, in terms of the reduction of power consumption, a switch using a MOSFET that does not required standby power is desirable.

Further, in recent years, with the appearance of a white LED, information can be transmitted with larger light energy. To be more specific, light is provided with information by turning on/off the white LED at a very short interval. As a system utilizing such a feature, an attempt is made to set the white LED for transmitting information is set on an outdoor video billboard or indoors, and supply information in a range where light can reach. However, in the case where this system is developed, and signal generation sources are positioned at many places, a reception side does not know from which direction light information comes. Therefore, it is necessary to operate a circuit for receiving light information at all times. This is not so different from a mobile telephone using an electronic wave, so the merit of using the white LED is reduced by one-half.

This is also applied to an infrared remote controller circuit of a TV or an air conditioner that is currently being used. An infrared circuit is always being operated so that infrared light is received at any time. In the case of an air conditioner that is used only in summer, the power is consumed even if it is not being used as long as a cord is plugged into an outlet. This is also applied to other remote controller devices.

The present invention has been achieved for the purpose of reducing the wasteful standby power, and is optimum for a system for simultaneously transmitting light energy and signal information as described above. The power generation source 1 that is a solar battery generates power by transmitting light energy, and a signal receiving circuit that is the load circuit 9 is operated with the power from the power source 7 such as an AC power source or a battery by turning on the switch 8, whereby the transmitted information is processed. Thus, the appliance does not start being operated until receiving light, so the wasteful standby power can be reduced, and the battery life of the appliance can be prolonged remarkably.

Further, as another specific place for using the electronic device of this embodiment, an appliance that is operated upon receiving light, such as a brightness adjusting circuit of a TV connected to a light sensor, is suitable. The present invention is applicable to a system in which the body temperature is converted into electricity to turn on the switch 8 when the system is not only supplied with light but also touched by the hand, a system in which a rotation power generator attached to a door is operated when the door is opened, whereby the switch 8 is turned on, a system in which a windmill rotates upon receiving the wind and a power generator is operated, whereby the switch 8 is turned on, and the like. At this time, the power generation source 1 generates power in accordance with the environmental change in the outside, and the switch 8 is turned on, whereby the signal receiving circuit that is the load circuit 9 is operated with the power from the power source 7 such as an AC power source or a battery. Herein, in a system in which a street light lights up when it gets dark, as in a street light with a light sensor, a switch is used for interrupting the connection between power source 7 and the load circuit 9 while the power is supplied to the first control terminal S8-1 of the switch 8, and bringing the power source 7 and the load circuit 9 into conduction while the power is not supplied to the first control terminal S8-1 of the switch 8, whereby the power consumption of a light sensor can be reduced without changing the previous operation.

With the above configuration, the power is not required for controlling a switch for interrupting the power source and the electronic circuit unlike the conventional example, but the power consumption during a standby state of the entire electronic device becomes very small.

The booster circuit for starting the operation from a low voltage is connected to the power generation source, so the switch can be controlled even if a power generation source is small and the voltage of generated power is low.

Further, the charge/discharge circuit and the capacitor are connected to the booster circuit, even if the generated power of the power generation source is small, so the power is stored in the capacitor and supplied to a switch at once, whereby the switch can be controlled.

What is claimed is:

1. An electronic device, comprising:
   a power source;
   an electronic circuit for operating with power of the power source;
   a switch circuit connected between the power source and the electronic circuit;
   a power generation source for generating power with energy derived from external environment; and
   a switch control circuit that is driven with the power of the power generation source, for controlling the switch circuit,
   wherein the switch circuit is operated with power from an output terminal of the switch control circuit via a diode.

2. An electronic device according to claim 1, further comprising a booster circuit connected between the power generation source and the switch control circuit.

3. An electronic device according to claim 2, further comprising a detection circuit for monitoring a state of the switch circuit,and controlling an operation of the booster circuit.

4. An electronic device according to claim 3, wherein the detection circuit for detecting an ON state of the switch circuit and stopping the booster circuit.

5. An electronic device according to claim 1, wherein the switch control circuit further comprises a capacitor and has a function of controlling charge/discharge of the capacitor.

6. An electronic device according to claim 1, wherein the switch circuit is a latch-type switch circuit;and
   wherein the latch-type switch circuit has a control terminal connected to the output terminal of the switch control circuit ,an input and toggle terminal connected to an output terminal of the power source, and an output terminal connected to an input terminal of the electronic circuit.

7. An electronic device according to claim 1, wherein the switch circuit is operated with the power from the output terminal of the switch circuit via the diode.

8. An electronic device according to claim 1, wherein the power generation source converts the energy of any one of light, heat, motion, and an electromagnetic wave into electric energy.

* * * * *